United States Patent [19]
Kim

[11] Patent Number: 6,120,668
[45] Date of Patent: Sep. 19, 2000

[54] APPARATUS FOR PREPARING HEXAGONAL WATER

[76] Inventor: Chang Jin Kim, 272-4 Sanglim-ri, Ceochang-up, Geochang-gun, Kyungsangnam-do, Rep. of Korea, 670-800

[21] Appl. No.: 09/155,973
[22] PCT Filed: Apr. 3, 1997
[86] PCT No.: PCT/KR97/00059
§ 371 Date: Oct. 9, 1998
§ 102(e) Date: Oct. 9, 1998
[87] PCT Pub. No.: WO98/35913
PCT Pub. Date: Aug. 20, 1998

[30] Foreign Application Priority Data

Feb. 13, 1997 [KR] Rep. of Korea .......................... 97-4988

[51] Int. Cl.[7] .............................. C02F 1/48; C25B 15/00; B01D 24/38
[52] U.S. Cl. .......................... 204/664; 204/666; 204/240; 210/103
[58] Field of Search .................................. 204/664, 666, 204/240; 210/103

[56] References Cited

FOREIGN PATENT DOCUMENTS 9502110 3/1995 Rep. of Korea .

Primary Examiner—Kathryn Gorgos
Assistant Examiner—Thao Tran
Attorney, Agent, or Firm—Jacobson, Price, Holman & Stern, PLLC

[57] ABSTRACT

A method and apparatus for manufacturing hexagonal water using two cases separated from one another and joined by a common conduit which runs through each case. Each case is divided into spaces, with each space having a magnet and at least one associated reflection plate. The magnets and the reflection plates are mounted on the conduit as it passes through the spaces in the two cases. The magnets and reflection plates in the spaces of the first case are constructed to impart vertical magnetization, while the magnets and reflection plates in the spaces of the second case are constructed to impart horizontal magnetization. Water passing through the conduit is subjected to the magnetic fields and converted to hexagonal water. Imparting the same direction of magnetic field within each case minimizes loss of flow rate, increasing the efficiency of the manufacture of the hexagonal water.

9 Claims, 2 Drawing Sheets

APPARATUS FOR PREPARING HEXAGONAL WATER

TECHNICAL FIELD

The present invention relates to an apparatus for preparing hexagonal water and, more particularly, to an apparatus for preparing hexagonal water, by which the usual molecular structure of the water can be readily converted into a hexagonal ring structure by utilizing the characteristic of magneto-ions.

BACKGROUND ART

As is commonly known, the molecular structure of the water consists of one positively charged oxygen and two negatively charged hydrogens. Water is in a liquid state between 0° C. and 100° C., but it is a solid below 0° C. and a gas above 100° C. The water in a solid or a liquid state is characterized by the expansion in its volume.

When the phase transition occurs for the water from a liquid phase to a solid, the usual molecular structure of the water as expressed in FIG. 4 changes into the hexagonal ring molecular structure as shown in FIG. 5. In the aspect of the this theory, many studies have been fruitfully made on the preparation of the hexagonal ring-structured water in a liquid state.

The technique for making the hexagonal ring-structured water in a liquid state varies in many countries including several developed countries such as America, Russia and Japan, as well as Korea. The present invention contrives a novel method of preparing the hexagonal water (hereinafter, it means the hexagonal ring structure water, that is, the water consisting of hexagonal ring-structured water molecules) with a simple apparatus.

Korean Patent No. 85510 (Publication No. 95-2110) secured by the applicant of the present invention discloses a simple but very effective apparatus for preparing the hexagonal water, converting the usual molecular structure of the water into a hexagonal ring structure by passing the water through a water pipe 2 and a conduit 9 with the yield of about 70–80%.

Compared with the above-described example, great improvements have been made in the present invention so as to increase the yield of the hexagonal water by about 20–30, by which the structure of the water is changed into a hexagonal ring molecular structure with the yield of at least 95%, or up to 100%. This comparison is based on the assumption that the flux in the water pipe 2, the conduits 9 and 9', and drain-pipes 3 and 3' is the same in both the prior art and the present invention.

In addition to the techniques for preparing the hexagonal water, the usages of the hexagonal ring molecular water are cleared through a well-known theory which has been introduced in all sorts of papers and magazines since 1970's.

It is a known fact that the body fluids of animals including human and plants consists of the water which has a hexagonal molecular structure instead of an usual structure of the water even at a room temperature. In the hexagonal water, it is impossible for a microbe to survive because oxygens in the hexagonal water molecules are not available and the microbe is subject to various unfavorable influences of a magnetic energy of about 0.5 Gauss inevitably caused by the bonding reaction between the positively charged hydrogens and negatively charged oxygens that are six times as many as the usual water. Further, an alive microbe in the hexagonal water is under the unfavorable conditions against its propagation. For that reason, sufficient hexagonal ring structure water in a human body will be better for health.

According to another medical study, a human body requires water in an amount of 3–5 L a day on average and the absorbed water $H_2O$ in the body is converted into the hexagonal water $(H_2O)_6$ so as to compensate the amount of body fluid discharged out of the body as sweat, urine and the like. But, thus changed hexagonal water is unfortunately insufficient in the body.

Under the dangerous environment such as water pollution today, our bodies lack sufficient leukocytes and the hexagonal water required to detoxify, neutralize and sterilize all sorts of poison and germs. Besides, even the usual potable water is teeming with colitis germs as well as various heavy metals. As for the city piped water which contains all sorts of chemicals such as chlorine $Cl_2$, it is possible for us to be subject to numerous diseases because the chemicals are gradually accumulated in our body even though they can be somewhat removed through the self-purification in the body.

To overcome this problem of the city water, boiled water is favored by people so as to neutralize the residual germs and poisons in the water. However, drinking boiled water may weaken the immunity of our body because the boiled water becomes deficient in oxygen. Therefore the usual water including the city piped water possibly hinders the harmonious metabolism in our body, thereby causing different geriatric diseases.

Scientists in the developed countries reached a conclusion that hexagonal water having a hexagonal ring molecular structure is of benefit to human health after a long study on the molecular structure of the water in a human body.

It is evident that many studies have been made on the hexagonal water in many countries, especially on the method of preparing the hexagonal water with a simple apparatus.

The advantages of the hexagonal water in the human body will be understood through the following theory.

The earth magnetic field flowing on the earth from the north to the south is about 0.5 Gauss. When the human body absorbs the earth magnetic field of at least 0.5 Gauss, the body can produce a voltage of about 5.5V as to induce the palpitation of the heart and to be subject to constant metabolism for nutritive elements and oxygens. However, the fact is that our body cannot absorb the earth magnetic field of 0.5 Gauss but between 0.25 and 0.35 Gauss because of our undesirable living conditions such as air pollution, water contamination, the destruction of an ozone layer, an excessive exposure to radiation and the like. For that reason, the human body can generate a voltage of only about 3V or so, thereby causing all sorts of diseases due to a low metabolism in the body.

DISCLOSURE OF INVENTION

Accordingly, the present invention is directed to an apparatus for preparing hexagonal water that substantially obviates one or more of the problems due to limitations and disadvantages of the related art.

An object of the present invention is to provide an apparatus for preparing hexagonal water by which the usual water is readily converted into the hexagonal water as contained in a body fluid under the influence of a magnetic field with the yield of at least 95% and up to 100%, thereby promoting the human body's health and effectively purifying the waste water.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for preparing hexagonal water includes: a first case and a second case made of materials having a property of screening a magnetic line, the first case being installed around a first conduit and separated from the second case at a predetermined interval; the second case being installed around a second conduit; screening separation plates installed in parallel at predetermined intervals inside the case A and the case B so as to divide the cases into spaces A and spaces B; a first ferrite magnet attached to the outer and bottom surface of the first conduit in each space A, both ends of the first ferrite magnet attached horizontally to the conduit; first two integrated induction reflecting plates installed in parallel on the outer and top surface of the first conduit in each space A; a second ferrite magnet attached to the outer and bottom surface of the second conduit in each space B, both ends of the second ferrite magnet vertically attached to the conduit; second two integrated induction reflecting plates installed opposite to each other and attached to both ends of the second ferrite magnet; and magneto-ion liquified lay closely packed in the spaces A and spaces B.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
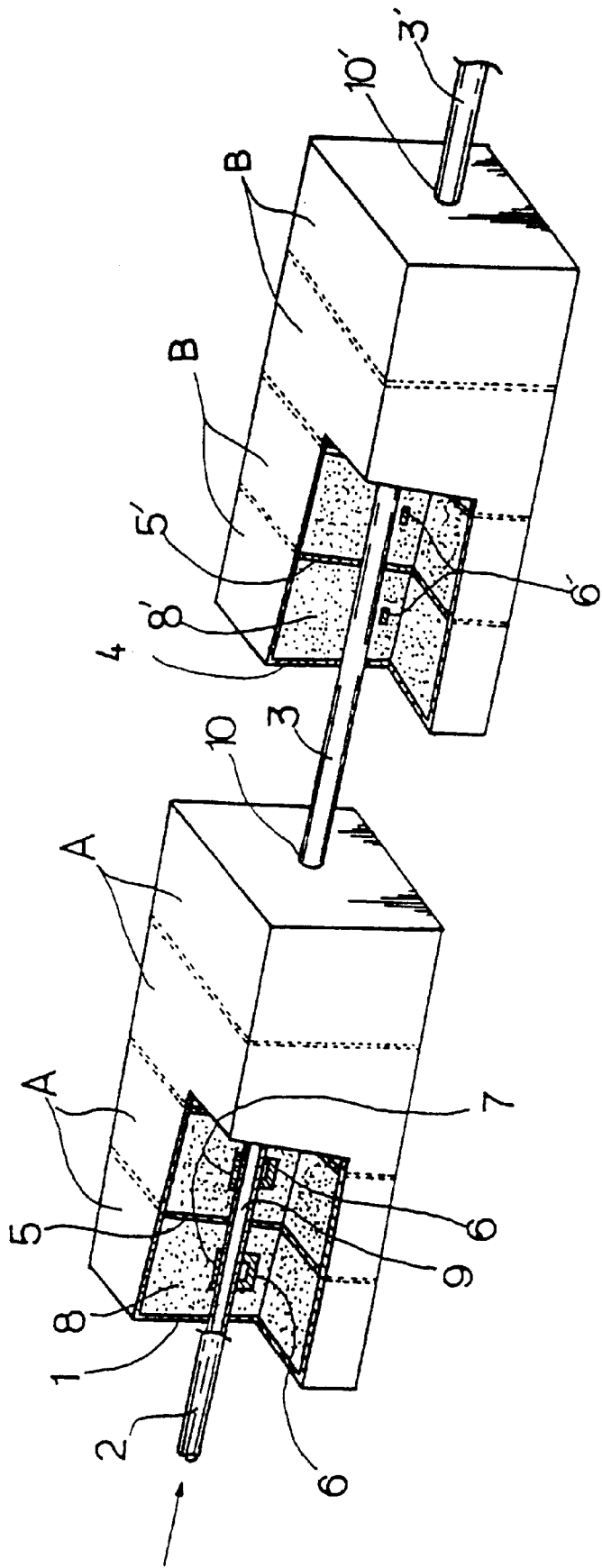
FIG. 1 is a partially cutaway perspective view of the apparatus for preparing hexagonal water according to the present invention.

Referring to FIG. 1, which shows the apparatus for preparing hexagonal water according to the present invention, there are installed a first case 1 and a second case 4 at an interval of about 1 m from each other and around a common conduit or pipe 3 that is made of stainless steel or cast iron. These cases 1 and 4 will be described in detail later. As used herein, that portion of the pipe 3 passing through the first case is referred to as the first conduit 9 and that portion of the pipe passing through the second case is referred to as the second conduit 9'. The portion of the pipe leading to the inlet of the first case is the water pipe 2, and that portion exiting the second case is the drain pipe 3'.

Figure 2:
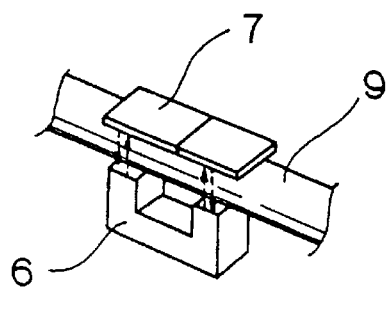
FIG. 2 is a detail enlarged view of a space A in FIG. 1.

Inside the case 1, there are consecutively installed screening separation plates 5 each of which has an aperture 10 in the center thereof so as to divide the case 1 into four spaces A in serial form. In each space A, a ferrite magnet 6 which is capable of generating a magnetic field of about 4000–7000 Gauss is attached to the outer and bottom surface of a conduit 9 which passes through the respective space A, as shown in FIG. 2. In addition, two integrated induction reflecting plates 7 made of iron and special alloy are installed in parallel on the opposite side to the ferrite magnet 6 on the conduit 9. The ferrite magnet 6 and the integrated induction reflecting plates are naturally attached to the outer surface of the conduit 9 by the magnetic field generated from the respective elements.

Figure 3:
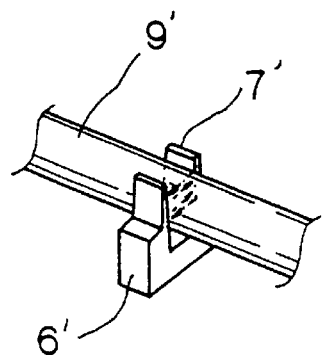
FIG. 3 is a detail enlarged view of a space B in FIG. 1.
Figure 4:
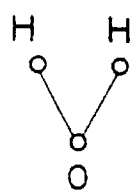
FIG. 4 shows the molecular structure of usual water.
Figure 5:
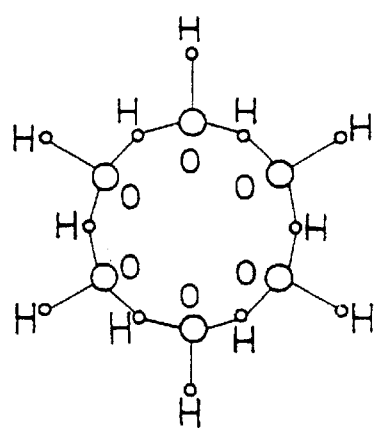
FIG. 5 shows the hexagonal ring molecular structure of hexagonal water.

Inside the second case 4, there are also consecutively installed screening separation plates 5' each of which has an aperture 10' in the center thereof so as to divide the case 4 into four spaces B in serial form. As shown in FIG. 3, a ferrite magnet 6' of about 4000–7000 Gauss is attached to the outer and bottom surface of a conduit 9' which passes through the respective space B. Further, there are installed two integrated induction reflecting plates 7' made of iron and special alloy so as to be opposite to each other on both sides of the conduit 9'.

The similarities and differences between the two structures of FIG. 2 and FIG. 3 may be described as follows in more detail. While the two integrated induction reflecting plates 7 are installed on the opposite side to the ferrite magnet 6 installed on the conduit 9 in the space A as shown in FIG. 2, the two integrated induction reflecting plates 7' in the space B are installed on opposite sides to each other and mounted on both ends of the ferrite magnet 6' as shown in FIG. 3.

Further, each of the four spaces A have the same structures of FIG. 2 and each of the four spaces B have the same structures of FIG. 3. Then, all the total hollowed spaces A and B are packed with magneto-ion liquefied clay 8 which is formed by stirring the uniform mixture of a known magneto-ion solution and kaoline or clayey soil.

The functions and effects of the present invention are described as follows.

The usual water flowing in a water pipe 2 installed outside the case 1 is eventually let out of a drain-pipe 3' which is formed at the end of the case 4. During that time, the magnetic line generated from the ferrite magnets 6 and 6' passes through the conduits 9 and 9' in the spaces A and B and arrives at the integrated induction reflecting plates 7 and 7'. The magnetic line struck on the integrated induction reflecting plates 7 and 7' is reflected and returned to the original position. Then, a magnetic field is caused by these repeated reflections of the numerous magnetic lines which take place simultaneously or at time intervals. The molecules of the water struck by the magnetic field are automatically changed into ring structured molecules. In other words, the molecules of the water consisting of $H_2O$ are converted into the hexagonal water which has the hexagonal ring molecular structure $(H_2O)_6$ under the influence of the magnetic field.

The magnetic field is induced by the integrated induction reflecting plates 7 and 7' and successively reflected by the angle of reflection between 90° and 180°.

On the basis of this theory, the hexagonal ring structure of the water molecule is completely formed because the magnetic field reflected by 180° is reflected again by 90°.

Greater frequency of the reflection will produce more and more hexagonal ring structured water molecules.

Consequently, according to the present invention, the spaces A and B separated by the screening separation plates 5 and 5' are packed with the magneto-ion liquefied clay 8 around the reflecting plates 7 and 7' and the magnets 6 and 6'.

The above-described magneto-ion liquefied clay 8 envelops all the elements in the apparatus and concurrently induces the integrated induction plates so as to convert the molecular structures of the water into hexagonal ring structures and neutralize all sorts of poisonous substances into harmless ones.

However, the water molecules that are not under the direct influence of the magnetic field will remain unchanged and move into the space B. Therefore, expecting the formation of the magnetic field in the direction of the arrow in FIG. 2, the apparatus according to the present invention is provided with the reflection plates 7' of the space B in different construction from the space A as shown in FIG. 3.

Because a plurality of spaces A are installed to be apart from a plurality of spaces B according to the construction of the present invention as described above, the reflection of the magnetic field can take place in a close shape like the Chinese character for 'well' (#) and the generation of the magnetic field can be improved. In addition, the constant flux of the water intended in the present invention increases the production of the hexagonal water and reduces the unexpected variation of the magnetic strength.

According to the present invention, the case 1 having a plurality of the spaces A is installed prior and the case 4 having a plurality of the spaces B is installed at an interval from the case 1. That is because the water can be converted into the hexagonal water with the yield of at least 95% and up to 100% when the magnetic field is successively generated in one direction and, after a time interval, the magnetic field is repeatedly generated in another direction.

If the internal structures of the spaces B lie adjacent to those of the spaces A, the molecular structure of the water does not completely change into a hexagonal ring structure due to the disorder of the ring molecule of the water striking the magnetic field. Hence, the present invention induces the successive generation of the magnetic field in a direction for the purpose of obtaining the hexagonal ring-structured water, ceases the conversion of the water molecules for an interval, and then induces the successive generation of the magnetic field again in another direction so as to change the water molecules.

To summarize the process as described above, some amount of the usual water passed through the conduit of the spaces A is converted into the hexagonal water and the amount of the converted hexagonal water is gradually increased in the spaces B. Finally in the drain-pipe 3' at the end of the spaces B, the water has been mostly changed into the hexagonal water.

The cases 1 and 4, and the screening separation plates 5 and 5' are preferably made of an alloy of 27 sorts of stainless or aluminum and nickel through which the magnetic field cannot pass, thereby keeping the generated magnetic field inward of the cases and preventing the adhesion of contaminants such as oxided steel on the outer surface of the conduits 9 and 9'. With this, the present invention can prevent the decrease and the dispersion of the magnetic strength, and the formation of scales. For reference, the sizes of the cases 1 and 4 are about 30–40 cm in width and length and about 50–60 cm in height.

The magneto-ion liquefied clay 8 indirectly accelerates the activation of the magnetic field inside the respective spaces.

As described above, the magnetic line generated from the magnets 6 and 6' is successively reflected at the reflecting plates 7 and 7' and the thus formed magnetic field influences the water introduced through the water pipe 2 to change into the hexagonal water molecule which contains six times as many oxygens as the usual water.

In addition, the hexagonal water obtained according to the present invention has less odor than the city pipe water which may be offensively smelling due to chlorine, fluorine and phenols contained therein. That is because the increased hydrogens and oxygens six times as many as the usual water can dilute the components such as chlorine and fluorine.

In another aspect of the present invention, it is possible to improve the quality of waste water. The water contamination has been one of serious problems with industrial development and population growth in recent days, thereby rapidly decreasing the COD (Chemical Oxygen Demand) and the BOD (Biological Oxygen Demand). The contaminated waste water which lacks in oxygen can be effectively purified by installing the present invention at one site of the final drainage pipe in all sorts of waste water disposal plants.

However, the present invention must be used after existing waste water disposal plants are sufficiently utilized for cleaning the waste water. Waste water that is pretreated by water disposal plants can be changed into hexagonal water to a degree almost as clean as the usual natural water by about 95–100%.

It will be apparent to those skilled in the art that various modifications and variations can be made in the apparatus for preparing hexagonal water of the present invention without departing from the spirit or scope of the invention. Thus, it is intended that the present invention cover the modifications and variations of this invention provided they come within the scope of the appended claims and their equivalents.

What is claimed is:

1. An apparatus for preparing hexagonal water, comprising:

a water pipe having an intake end and a drain end;

a first case installed around a first conduit, said first conduit being part of said water pipe adjacent the intake end and surrounded by said first case;

a second case installed around a second conduit, said second conduit being part of said water pipe adjacent the drain end and surrounded by said second case, said first case and said second case being separated from one another at a predetermined interval;

a plurality of screening separation plates installed in parallel at predetermined intervals inside the first case so as to divide the first case into a first plurality of spaces;

a plurality of screening separation plates installed in parallel at predetermined intervals inside the second case so as to divide the second case into a second plurality of spaces;

a first ferrite magnet attached to an outer bottom surface of the first conduit in each of said first plurality of spaces, both ends of said first ferrite magnet attached horizontally to the first conduit;

a first pair of integrated induction reflecting plates installed in parallel on an outer top surface of the first conduit in each of said first plurality of spaces;

a second ferrite magnet attached to an outer bottom surface of the second conduit in each of said second plurality of spaces, both ends of said second ferrite magnet attached vertically to the second conduit;

a second pair of integrated induction reflecting plates installed opposite each other and attached to both ends of the second ferrite magnet in each of said second plurality of spaces; and magneto-ion liquified clay closely packed in the first and second plurality of spaces;

wherein water flowing through the pipe is vertically magnetized in each of said first plurality of spaces and then subsequently horizontally magnetized in each of said second plurality of spaces, subjection of the water to a single direction of magnetization in the first case followed by subjection of the water to a different single direction of magnetization in the second case minimizing a decrease in flow velocity caused by conversion of the water to hexagonal water through magnetization.

2. The apparatus as set forth in claim 1 wherein that portion of the water pipe connecting the first case to the second case by a distance defined by the predetermined interval does not subject the water to magnetization and thereby the flow velocity of the water within that portion is increased.

3. An apparatus for preparing hexagonal water, comprising:

a water pipe having a first conduit, a second conduit and a middle portion joining the first conduit to the second conduit;

a first case installed around the first conduit;

a second case installed around the second conduit, said first case and said second case being separated from one another at a predetermined interval defined by a length of said middle portion;

a plurality of screening separation plates installed in parallel at predetermined intervals inside the first case so as to divide the first case into a first plurality of spaces;

a plurality of screening separation plates installed in parallel at predetermined intervals inside the second case so as to divide the second case into a second plurality of spaces;

within each of said first plurality of spaces,
    a first ferrite magnet attached to an outer bottom surface of the first conduit, both ends of said first ferrite magnet attached horizontally to the first conduit; and
    a first pair of integrated induction reflecting plates installed in parallel on an outer top surface of the first conduit above the first ferrite magnet;

in each of said second plurality of spaces,
    a second ferrite magnet attached to an outer bottom surface of the second conduit, both ends of said second ferrite magnet attached vertically to the second conduit; and
    a second pair of integrated induction reflecting plates installed opposite each other on either side of said second conduit, each plate of said second pair of plates attached to one end of the second ferrite magnet; and magneto-ion liquified clay closely packed in the first and second plurality of spaces;

wherein water when flowing through the first conduit is vertically magnetized in each of said first plurality of spaces, said water when flowing through the second conduit is horizontally magnetized in each of said second plurality of spaces, repeated subjection of the water to a single direction of magnetization followed by repeated subjection of the water to a different single direction of magnetization minimizing a decrease in flow velocity caused by conversion of the water to hexagonal water.

4. The apparatus as set forth in claim 3 wherein the middle portion of the water pipe does not subject the water to magnetization and thereby the flow velocity of the water within the middle portion is increased.

5. The apparatus as set forth in claim 3 wherein the first case is divided into four spaces, the four spaces in series subjecting the water flow through the first conduit to four consecutive vertical magnetization fields.

6. The apparatus as set forth in claim 3 wherein the second case is divided into four spaces, the four spaces in series subjecting the water flow through the second conduit to four consecutive horizontal magnetization fields.

7. The apparatus as set forth in claim 3 wherein the first case is divided into four spaces, the four spaces of the first case in series subjecting the water flow through the first conduit to four consecutive vertical magnetization fields, the middle portion of the water pipe increasing the flow velocity of the water in an absence of magnetization forces between the cases, and wherein the second case is divided into four spaces, the four spaces of the second case in series subjecting the water flow through the second conduit to four consecutive horizontal magnetization fields.

8. The apparatus as set forth in claim 3 wherein the water flows through the first conduit, through the middle portion and then through said second conduit.

9. The apparatus as set forth in claim 3 wherein the water flows through the second conduit, through the middle portion and then through said first conduit.

* * * * *